US008626855B2

(12) United States Patent
Pounds et al.

(10) Patent No.: US 8,626,855 B2
(45) Date of Patent: *Jan. 7, 2014

(54) METHOD AND APPARATUS FOR CORDLESS PHONE AND OTHER TELECOMMUNICATIONS SERVICES

(75) Inventors: Gregory E. Pounds, San Jose, CA (US); Timothy J. Kusumi, Los Gatos, CA (US)

(73) Assignee: BroadSoft Casabi, LLC, Gaithersburg, MD (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/014,560

(22) Filed: Jan. 26, 2011

(65) Prior Publication Data

US 2011/0159852 A1 Jun. 30, 2011

Related U.S. Application Data

(63) Continuation of application No. 11/175,991, filed on Jul. 5, 2005, now Pat. No. 7,975,011.

(60) Provisional application No. 60/585,375, filed on Jul. 2, 2004.

(51) Int. Cl.
*G06F 15/16* (2006.01)
*G06F 15/173* (2006.01)
*H04M 11/10* (2006.01)
*G06F 3/00* (2006.01)

(52) U.S. Cl.
USPC ........... 709/206; 709/207; 709/223; 709/238; 709/246; 455/413; 715/700

(58) Field of Classification Search
USPC .......... 709/206, 207, 223, 238, 246; 455/413; 715/700
See application file for complete search history.

(56) References Cited

U.S. PATENT DOCUMENTS 5,012,466 A 4/1991 Buhrke et al.
5,999,525 A 12/1999 Krishnaswamy et al.
(Continued)

FOREIGN PATENT DOCUMENTS

EP 1113620 7/2001
EP 1235397 8/2002
(Continued)

OTHER PUBLICATIONS

Affidavit Pursuant to 37 CFR 1.56, submitted in related U.S. Appl. No. 12/636,586, signed by inventor Stephen Kwo, Dated Dec. 10, 2009, 1 page.

(Continued)

*Primary Examiner* — Ranodhi Serrao
*Assistant Examiner* — Farrukh Hussain
(74) *Attorney, Agent, or Firm* — Jenkins, Wilson, Taylor & Hunt, P.A.

(57) ABSTRACT

Systems, methods and apparatus are provided that combine a software application framework within a variety of consumer communication devices to provide enhanced functionality. The enhanced functionality devices can then be controlled and integrated into an Internet based application and delivery service, connected by various networking technologies including, e.g., broadband communication systems. Centralized and distributed services allow a user to modify a variety of parameters that will ultimately control how information is delivered. The solution can also be controlled by service providers as a method for integrating their existing application infrastructure and potentially new applications within an overall broadband communication service.

18 Claims, 3 Drawing Sheets

(56) References Cited

U.S. PATENT DOCUMENTS

| | | | |
|---|---|---|---|
| 6,223,286 B1 | 4/2001 | Hashimoto | |
| 6,453,329 B1 | 9/2002 | Dodgen | |
| 6,463,462 B1 | 10/2002 | Smith et al. | |
| 6,523,021 B1 | 2/2003 | Monberg et al. | |
| 6,665,711 B1 | 12/2003 | Boyle et al. | |
| 6,671,424 B1 | 12/2003 | Skoll et al. | |
| 6,714,222 B1 | 3/2004 | Bjorn et al. | |
| 6,721,306 B1 | 4/2004 | Farris et al. | |
| 6,738,981 B1 | 5/2004 | Tonnby et al. | |
| 6,741,853 B1* | 5/2004 | Jiang et al. | 455/418 |
| 6,748,095 B1 | 6/2004 | Goss | |
| 6,757,365 B1* | 6/2004 | Bogard | 379/88.17 |
| 6,826,559 B1 | 11/2004 | Ponte | |
| 6,826,597 B1 | 11/2004 | Lonnroth et al. | |
| 6,871,236 B2* | 3/2005 | Fishman et al. | 709/246 |
| 6,996,076 B1 | 2/2006 | Forbes et al. | |
| 7,016,351 B1 | 3/2006 | Fannacci et al. | |
| 7,027,818 B2 | 4/2006 | Bos et al. | |
| 7,035,923 B1 | 4/2006 | Yoakum et al. | |
| 7,149,287 B1* | 12/2006 | Burger et al. | 379/88.17 |
| 7,248,577 B2 | 7/2007 | Hakusui | |
| 7,272,400 B1* | 9/2007 | Othmer | 455/453 |
| 7,298,702 B1 | 11/2007 | Jones et al. | |
| 7,337,448 B1* | 2/2008 | Dalia et al. | 719/328 |
| 7,471,653 B2 | 12/2008 | McConnell et al. | |
| 7,509,425 B1 | 3/2009 | Rosenberg | |
| 7,525,955 B2 | 4/2009 | Velez-Rivera et al. | |
| 7,543,034 B2 | 6/2009 | Deshpande | |
| 7,610,328 B2 | 10/2009 | Haase et al. | |
| 7,694,127 B2 | 4/2010 | Adams et al. | |
| 7,761,526 B2 | 7/2010 | Pounds et al. | |
| 7,761,871 B2 | 7/2010 | Edwards et al. | |
| 7,769,383 B2 | 8/2010 | Deshpande et al. | |
| 7,813,485 B2 | 10/2010 | Yin et al. | |
| 7,826,603 B1 | 11/2010 | Denman et al. | |
| 7,849,205 B2 | 12/2010 | Pounds et al. | |
| 7,856,471 B2 | 12/2010 | Pounds et al. | |
| 7,864,673 B2 | 1/2011 | Bonner | |
| 7,975,011 B2 | 7/2011 | Pounds et al. | |
| 8,223,955 B2 | 7/2012 | Pounds et al. | |
| 8,463,872 B2 | 6/2013 | Pounds et al. | |
| 2001/0038624 A1 | 11/2001 | Greenberg et al. | |
| 2002/0042826 A1 | 4/2002 | Gaus et al. | |
| 2002/0042831 A1 | 4/2002 | Capone et al. | |
| 2002/0082938 A1 | 6/2002 | Borger et al. | |
| 2002/0087545 A1 | 7/2002 | Bright et al. | |
| 2002/0103898 A1 | 8/2002 | Moyer et al. | |
| 2002/0176404 A1 | 11/2002 | Girard | |
| 2002/0194601 A1 | 12/2002 | Perkes et al. | |
| 2003/0006911 A1 | 1/2003 | Smith et al. | |
| 2003/0028889 A1 | 2/2003 | McCoskey | |
| 2003/0070167 A1 | 4/2003 | Holtz et al. | |
| 2003/0076815 A1 | 4/2003 | Miller et al. | |
| 2003/0078928 A1 | 4/2003 | Dorosario et al. | |
| 2003/0093187 A1 | 5/2003 | Walker | |
| 2003/0182451 A1 | 9/2003 | Grass et al. | |
| 2003/0185365 A1 | 10/2003 | Mansfield | |
| 2003/0217110 A1 | 11/2003 | Weiss | |
| 2004/0058652 A1 | 3/2004 | McGregor | |
| 2004/0062383 A1* | 4/2004 | Sylvain | 379/265.06 |
| 2004/0085949 A1 | 5/2004 | Partanen et al. | |
| 2004/0125933 A1 | 7/2004 | Jun | |
| 2004/0128344 A1 | 7/2004 | Trossen | |
| 2004/0174971 A1 | 9/2004 | Guan | |
| 2004/0181706 A1* | 9/2004 | Chen et al. | 713/600 |
| 2004/0230659 A1 | 11/2004 | Chase | |
| 2004/0242230 A1 | 12/2004 | Rue | |
| 2004/0248594 A1 | 12/2004 | Wren | |
| 2004/0261115 A1 | 12/2004 | Bartfeld | |
| 2005/0002407 A1 | 1/2005 | Shaheen et al. | |
| 2005/0010475 A1 | 1/2005 | Perkowski et al. | |
| 2005/0050152 A1 | 3/2005 | Penner et al. | |
| 2005/0071361 A1 | 3/2005 | Hettish et al. | |
| 2005/0074102 A1 | 4/2005 | Altberg et al. | |
| 2005/0113649 A1 | 5/2005 | Bergantino | |
| 2005/0135315 A1 | 6/2005 | Sinha | |
| 2005/0198147 A1 | 9/2005 | Pastro et al. | |
| 2005/0198299 A1 | 9/2005 | Beck et al. | |
| 2005/0213724 A1 | 9/2005 | O'Brien et al. | |
| 2005/0232283 A1 | 10/2005 | Moyer et al. | |
| 2005/0249196 A1 | 11/2005 | Ansari et al. | |
| 2006/0026629 A1 | 2/2006 | Harris et al. | |
| 2006/0033809 A1 | 2/2006 | Farley | |
| 2006/0034266 A1 | 2/2006 | Harris et al. | |
| 2006/0117097 A1 | 6/2006 | Ogasawara et al. | |
| 2006/0136596 A1 | 6/2006 | Izumi | |
| 2006/0188080 A1 | 8/2006 | Terpstra | |
| 2006/0239242 A1 | 10/2006 | Huffschmid | |
| 2007/0039036 A1 | 2/2007 | Sullivan et al. | |
| 2007/0043829 A1 | 2/2007 | Dua | |
| 2007/0136441 A1 | 6/2007 | Chang et al. | |
| 2007/0149135 A1 | 6/2007 | Larsson et al. | |
| 2007/0208837 A1 | 9/2007 | Tian et al. | |
| 2007/0250865 A1 | 10/2007 | Krakirian | |
| 2007/0294336 A1 | 12/2007 | Pounds et al. | |
| 2008/0049910 A1 | 2/2008 | Pounds et al. | |
| 2008/0049919 A1 | 2/2008 | Pounds et al. | |
| 2008/0063159 A1 | 3/2008 | Pounds | |
| 2008/0077446 A1 | 3/2008 | Korpman et al. | |
| 2008/0086564 A1 | 4/2008 | Putman et al. | |
| 2008/0095344 A1 | 4/2008 | Jachner | |
| 2008/0313265 A1 | 12/2008 | Pounds et al. | |
| 2009/0296623 A1 | 12/2009 | Kwon | |
| 2009/0305681 A1 | 12/2009 | Adkins | |
| 2010/0159967 A1 | 6/2010 | Pounds et al. | |
| 2010/0169263 A1 | 7/2010 | Korpman et al. | |
| 2011/0116419 A1 | 5/2011 | Cholas et al. | |

FOREIGN PATENT DOCUMENTS

| | | |
|---|---|---|
| WO | WO00/18083 | 3/2000 |
| WO | WO 2006/014546 A2 | 2/2006 |
| WO | WO 2008/076905 A2 | 6/2008 |
| WO | WO 2011/072306 A1 | 6/2011 |

OTHER PUBLICATIONS

Affidavit Pursuant to 37 CFR 1.56, submitted in related U.S. Appl. No. 12/636,586, signed by inventor Gregory E. Pounds, Dated Dec. 10, 2009, 1 page.

Affidavit Pursuant to 37 CFR 1.56, submitted in related U.S. Appl. No. 12/636,586, signed by inventor Jonathan Cho, Dated Dec. 10, 2009, 1 page.

Affidavit Pursuant to 37 CFR 1.56, submitted in related U.S. Appl. No. 12/636,586, signed by inventor Chris Koverman, Dated Dec. 11, 2009, 1 page.

Affidavit Pursuant to 37 CFR 1.56, submitted in related U.S. Appl. No. 12/636,586, signed by inventor Shivakumar Jayaraman, Dated Dec. 11, 2009, 1 page.

Boulet, et al.; OmniPCX Office: Setting New Standards for Convergence in the SME Market; Oct. 2002: Alcatel Telecommunications Review pp. 3-5.

Bakker, et al.; Rapid development and deliver of converged services using API's; Aug. 28, 2002; Bell Labs Technical Journal, vol. 5 No. 3 pp. 12-29; retrieved on Mar. 29, 2008 from internet url—http://www.ecsl.cs.sunysb.edu/-srikant/papers/rapid_develop.ps.

Notice of Allowance and Fee(s) Due for U.S. Appl. No. 11/931,135 (Jun. 27, 2013).

Non-Final Office Action for U.S. Appl. No. 11/931,279 (Jun. 17, 2013).

Interview Summary for U.S. Appl. No. 11/931,359 (Jun. 5, 2013).

Non-Final Office Action for U.S. Appl. No. 11/931,359 (Apr. 12, 2013).

Notice of Allowance and Fee(s) Due for U.S. Appl. No. 12/636,586 (Feb. 28, 2013).

Communication Pursuant to Article 94(3) EPC for European Patent Application No. EP 05769220.4 (Feb. 15, 2013).

Interview Summary for U.S. Appl. No. 11/931,085 (Feb. 1, 2013).

Final Office Action for U.S. Appl. No. 11/931,085 (Nov. 21, 2012).

Restriction Requirement for U.S. Appl. No. 12/636,586 (Nov. 21, 2012).

(56) References Cited

OTHER PUBLICATIONS

Non-Final Office Action for U.S. Appl. No. 11/931,085 (Jun. 7, 2012).
Notice of Allowance and Fee(s) Due for U.S. Appl. No. 11/931,208 (Apr. 25, 2012).
Notice of Allowance and Fee(s) Due for U.S. Appl. No. 11/931,208 (Mar. 16, 2012).
Final Office Action for U.S. Appl. No. 11/931,085 (Feb. 23, 2012).
Advisory Action for U.S. Appl. No. 11/931,208 (Jan. 12, 2012).
Advisory Action for U.S. Appl. No. 11/931,279 (Nov. 8, 2011).
Final Office Action for U.S. Appl. No. 11/931,208 (Nov. 3, 2011).
Non-Final Office Action for U.S. Appl. No. 11/931,085 (Jun. 9, 2011).
Final Office Action for U.S. Appl. No. 11/931,279 (Aug. 18, 2011).
Interview Summary for U.S. Appl. No. 11/931,208 (Aug. 10, 2011).
Advisory Action for U.S. Appl. No. 11/931,135 (May 19, 2011).
Non-Final Office Action for U.S. Appl. No. 11/931,208 (May 19, 2011).
Notice of Non-Compliant Amendment for U.S. Appl. No. 11/931,279 (May 16, 2011).
InternationalSearch Report for PCT International Patent Application No. PCT/US2010/060150 (Apr. 22, 2011).
Notice of Allowance and Fee(s) Due for U.S. Appl. No. 11/175,991 (Apr. 5, 2011).
Final Office Action for U.S. Appl. No. 11/931,135 (Mar. 2, 2011).
Interview Summary for U.S. Appl. No. 11/931,279 (Mar. 2, 2011).
International Preliminary Examination Report for PCT International Application No. PCT/US2007/087616 (Feb. 4, 2011).
Non-Final Office Action for U.S. Appl. No. 11/931,279 (Nov. 26, 2010).
Non-Final Office Action for U.S. Appl. No. 11/175,991 (Oct. 18, 2010).
Notice of Allowance and Fee(s) Due for U.S. Appl. No. 11/931,421 (Aug. 13, 2010).
Notice of Allowance and Fee(s) Due for U.S. Appl. No. 11/931,485 (Jul. 26, 2010).
Non-Final Office Action for U.S. Appl. No. 11/931,135 (Jun. 25, 2010).
Final Office Action for U.S. Appl. No. 11/931,359 (Jun. 7, 2010).
Interview Summary for U.S. Appl. No. 11/931,421 (May 14, 2010).
Notice of Abandonment and Interview Summary for U.S. Appl. No. 11/745,888 (Apr. 28, 2010).
Final Office Action for U.S. Appl. No. 11/175,991 (Apr. 16, 2010).
Notice of Allowance and Fee(s) Due for U.S. Appl. No. 11/931,043 (Mar. 25, 2010).
Notice of Non-Compliant Amendment for U.S. Appl. No. 11/931,485 (Mar. 17, 2010).
Interview Summary for U.S. Appl. No. 11/931,359 (Mar. 2, 2010).
Communication Pursuant to Article 94(3) EPC for European Patent Application No. EP 05769220.4 (Feb. 26, 2010).
Nin-Final Office Action for U.S. Appl. No. 11/931,359 (Nov. 27, 2009).
Non-Final Office Action for U.S. Appl. No. 11/931,421 (Nov. 9, 2009).
Non-Final Office Action for U.S. Appl. No. 11/745,888 (Oct. 21, 2009).
Non-Final Office Action for U.S. Appl. No. 11/931,043 (Sep. 17, 2009).
Non-Final Office Action for U.S. Appl. No. 11/175,991 (Aug. 18, 2009).
Non-Final Office Action for U.S. Appl. No. 11/931,485 (Aug. 18, 2009).
Advisory Action for U.S. Appl. No. 11/175,991 (Jul. 6, 2009).
Interview Summary for U.S. Appl. No. 11/175,991 (Jun. 12, 2009).
Final Office Action for U.S. Appl. No. 11/175,991 (Apr. 14. 2009).
Interview Summary for U.S. Appl. No. 11/175,991 (Feb. 3, 2009).
Non-Final Office Action for U.S. Appl. No. 11/175,991 (Oct. 16, 2008).
Written Opinion of the International Searching Authority for PCT International Application No. PCT/US2007/087616 (May 1, 2008).
International Search Report for PCT International Application No. PCT/US2007/087616 (May 1, 2008).
Extended European Search Report for European Patent Application No. EP 05769220.4 (Oct. 2, 2007).
Notification of European Publication Number and Information on the Application of Article 67(3) EPC for European Patent Application No. EP 05769220.4 (Mar. 21, 2007).
International Preliminary Report on Patentability for PCT International Application No. PCT/US05/24105 (Jan. 9, 2007).
International Search Report for PCT International Application No. PCT/US05/24105 (Mar. 15, 2006).
Campbell et al., "Session Initiation Protocol (SIP) Extension for Instant Messaging," Network Working Group, RFC 3428 (Dec. 2002).
Rosenberg et al., "SIP: Session Initiation Protocol," Network Working Group, RFC 3261 (Jun. 2002).
Berners-Lee et al., "Uniform Resource Identifiers (URI): Generic Syntax," Network Working Group, RFC 2396 (Aug. 1998).
Leiba, "IMAP4 IDLE command," Network Working Group, RFC 2177 (Jun. 1997).

\* cited by examiner

Figure 4a
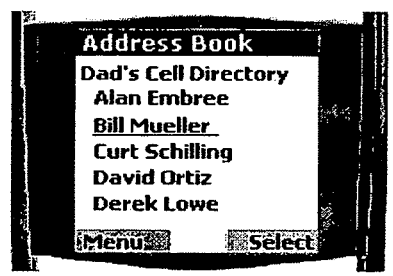
Figure 4b
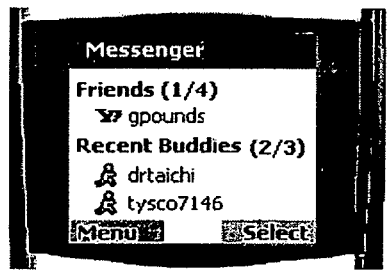
Figure 4c

METHOD AND APPARATUS FOR CORDLESS PHONE AND OTHER TELECOMMUNICATIONS SERVICES

CROSS REFERENCE TO RELATED APPLICATIONS

This application is a continuation of U.S. patent application Ser. No. 11/175,991, filed Jul. 5, 2005, which application is incorporated herein in its entirety by this reference thereto and which application claims benefit of U.S. provisional patent application Ser. No. 60/585/375, filed Jul. 2, 2004, which provisional patent application is incorporated herein in its entirety by this reference thereto.

BACKGROUND OF THE INVENTION

1. Field of the Invention

The present invention relates to telecommunications devices and services. More particularly, the present invention relates to the provision of telecommunication services to cordless end-user devices.

2. Description of Related Art

Telecommunications services have become widely available. Many services can be remotely accessed using Personal Computers and specially developed wireless devices. However, a broad range of telecommunications terminal equipment cannot be used to access the otherwise widely available services because of limitations in the terminal equipment including limited functionality, limited storage capacity, limited connectivity and incompatibility with current networked applications and data sources. Users of telecommunication terminal equipment such as telephones, intelligent picture frames and certain text entry devices must typically upgrade to latest generation equipment in order to directly interact with the Internet and Internet-connected service providers. Equipment capable of such interaction is typically complex, expensive and suffers from high power consumption and often become rapidly obsolete as technology advances.

SUMMARY

Embodiments provide systems and methods for extending telecommunications, Internet-based and other services to a variety of user devices. Various combinations of hardware and software components are configurable to provide enhanced functionality for end-user devices. In one example, the functionality of a cordless telephone handset can be extended to provide access to Instant messaging services. In some embodiments, content may be delivered to user devices in a preferred format that can include voice, text or other display technologies. Likewise, many embodiments may receive in voice, text and other formats of commands, requests and other input from a user device.

In many embodiments, a software application framework is provided to accommodate differences in user devices and service providers. In some embodiments, a base station provides enhanced connectivity between user devices and service providers. In some embodiments, portals, delivery engines gateways and other components can be used to marshal content from a variety of sources and to provide authorization, configuration and other centralized services to users and user devices. Embodiments are configurable by users and can be controlled by service providers as a method for integrating existing application infrastructure and new applications within an overall broadband communication service.

BRIEF DESCRIPTION OF THE DRAWINGS

These and other aspects and features of the present method and apparatus will become apparent to those ordinarily skilled in the art upon review of the following description of specific embodiments in conjunction with the accompanying figures, wherein:

FIG. 4a-4c shows certain examples of user device displays in accordance with an example embodiment.

DETAILED DESCRIPTION

Figure 1:
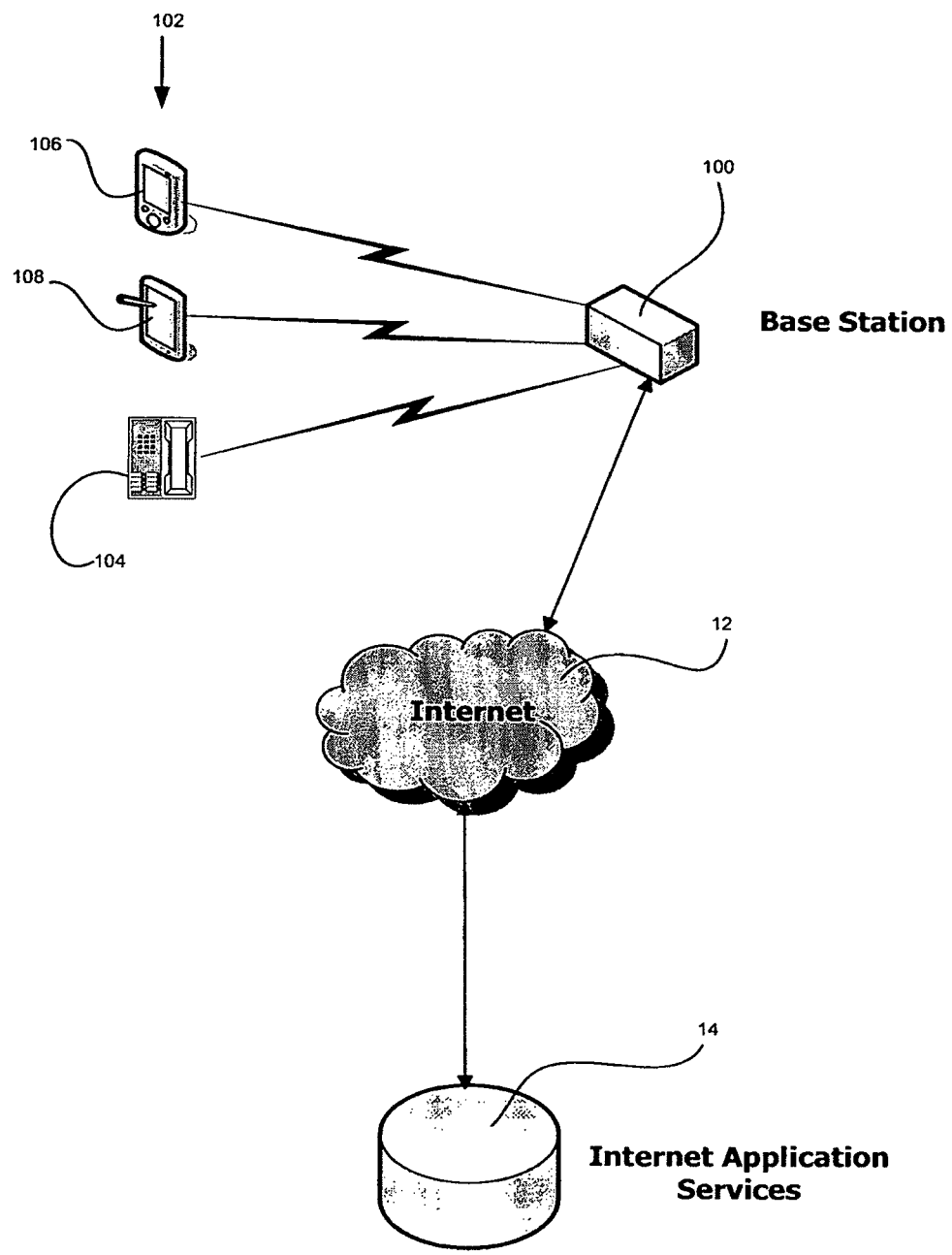
FIG. 1 shows components of an example embodiment.

Embodiments will now be described in detail with reference to the drawings, which are provided as illustrative examples so as to enable those skilled in the art to practice the invention. Notably, the figures and examples below are not meant to limit the scope of the present invention. In the drawings, like components, services, applications, and steps are designated by like reference numerals throughout the various figures. Where certain elements of these embodiments can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Embodiments of the invention comprise combinations of hardware and software components including a software application framework that may be used in association with information delivery systems, Internet based applications and delivery services. Certain embodiments provide enhanced functionality user devices. Embodiments of the invention are configurable by users and can be controlled by service providers as a method for integrating their existing application infrastructure and potentially new applications within an overall broadband communication service FIG. 1 is an illustration of an example of an embodiment of the invention. In the example, a broadband communication system, indicated generally at 10 accesses various services using, for example, broadband communications networks. The system 10 typically comprises a base station 100 and one or more associated user devices 102. In the example, the one or more user devices 102 can include any device capable of receiving and providing information to a user such as handsets 104 (e.g. cordless telephones), picture frames 106, text entry devices 108, clock radios (not shown) and so on. The base station 100 typically provides network connections through which the one or more user devices 102 can access network services 14 and information. The base station 100 can support network connections that utilize, for example, public switched telephone network ("PSTN"), Ethernet, wireless 802.11, Digital Enhanced Cordless Telecommunications ("DECT") and Worldwide Digital Cordless Telecommunications ("WDCT") systems.

Figure 2:
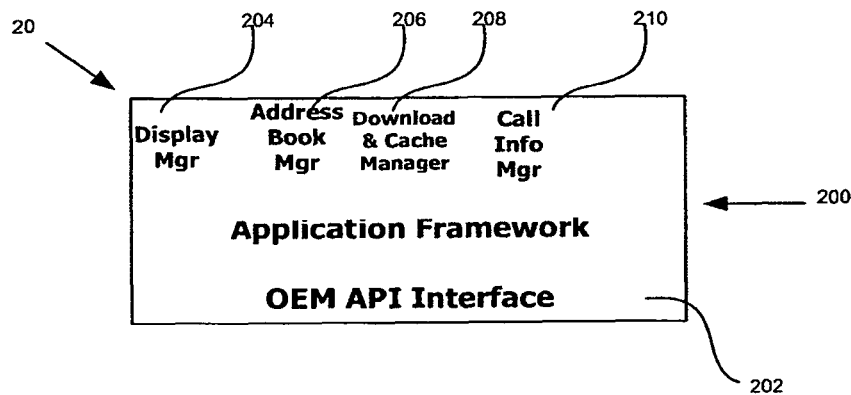
FIG. 2 illustrates a device control software in an example embodiment.

Referring also to FIG. 2, a device control software 20, comprising computer-readable instructions, including a software framework 200 enables communications between users and a set of internet application services 14 using, for example, the Internet 12. Communications over the Internet 12 typically use an application and services communication protocol ("ASCP") which can be a derivative of Session Initiation Protocol RFC 3261 ("SIP") with extensions. It will be appreciated that other suitable protocols can be employed to encapsulate the ASCP.

The base station 100 typically includes a high performance processor for executing device control software 20. The base station 100 typically communicates application data to the one or more user devices 102 using a selected wireless standard. In many embodiments, the base station 100 also includes one or more voice codecs for translating incoming and outgoing voice streams between different digital encoding formats. Base station 100 can include memory storage for storing recorded voice, download application data and content specific to features and services controlled by Internet application services 14. It will be appreciated that the quantity and type of storage can vary according to configuration and operating requirements of a base station 100 as implemented in a particular embodiment. In many embodiments, plural user devices 102 can be supported by a base station 100 such that the plural user devices can be registered at a base station 100 and can subsequently communicate with the base station 100 and with Internet application services 14 through the base station 100.

In many embodiments, certain of the one or more user devices 102 provide bidirectional visual and audio interface communications between Internet application services 14 and a user. For example, certain of the user devices 102 provide audio interfaces and keypad interfaces for communication from the user to the Internet application services 14.

It will be appreciated that many configurations of functionality of user devices 102 and base station 100 are contemplated. For example, the distribution of software components between base station 100 and one or more user devices 102 can be configured according to system requirements. In certain embodiments, one or more user devices 102 and base station 100 can be combined to form a single device. In certain embodiments, the combination of one or more user devices 102 and base station 100 may be effected on a temporary basis. Embodiments of the invention can accommodate various configurations of user devices 102 and base station 100 through associated software and system configuration.

The device control software 20 typically operates as base level control software that enables a broadband communication system 10 to perform a plurality of functions in many embodiments of the invention. In certain embodiments, a broadband communication device 10 provides an application interface 202 for the software application framework 200 that is typically used in association with information delivery systems. However, in some embodiments, the broadband communication device 10 may not provide direct integration with the Internet application services 14. Typically, the application interface 202 provides all of the integration points between the device control software 20 and the software application framework 200 such that various combinations of broadband communication system 10 and device control software 20 can be integrated with software application frameworks 200 merely by adapting the device application interface DAPI layer 202. Thus a wide range of device control software 20 is contemplated for supporting a wide variety of broadband communication systems 10.

In many embodiments, the software application framework 200 comprises a plurality of components that together can be used to process application and service requests, responses and data. For example, as shown in the example of FIG. 32 a software application framework 200 may comprise a wrapper for managing component communications and operations, a download and cache manager 208 for managing the download and storage of large data sets, an address book manager 206 for managing user interface and for integration with a network based phone directory, a display manager 204 for managing display of information to the user device and navigation through multiple screens and a call information manager 210 for managing call processing as configured by a user. The software application framework 200 can be designed to be extensible such that additional components can be added to the base structure.

In certain embodiments, the download and cache manager 208 manages download of large data sets to the base station 100 memory and thence to one or more user devices 102 as required. Download and cache manager 208 typically communicates to the Internet application services 14 by means of a broadband connection using the ASCP. Data sets can be encapsulated within extended SIP messages and sent to the base station 100. In many embodiments, the download and cache manager 208 provides a positive acknowledgement to the Internet application services 14 when a data set is received and successfully stored. In at least some embodiments, the base station 100 and user device 102 may be incapable of storing a data set, in which case the download and cache manager 208 may send back a negative acknowledgement in response to the ASCP data store request. It allows the system to interface to any size data set by only downloading part as needed. Typically, ASCP sends data store message includes addressing information for the individual data sets, wherein the addressing can be directed to the base station 100 or the user device 102.

In many embodiments, an address book manager 206 provides integration with network based address book storage data structures (not shown). The address book manager 206 typically accesses the Internet applications services 14 and provides a window into network based storage. The address book manager 206 can provide a remote user interface into the network based storage and can provide a window into the network based storage by downloading subsets of the data through the download and cache manager 208. Typically, each data component of the subset provides name, number and links for additional information. Additionally, a complete subset can also provide links to additional data subsets. In many embodiments, the address book manager 206 communicates with the display manager 204 to provide the user interface to a user device 102.

In certain embodiments, the display manager 204 manages the flow of display elements from other components of the software application framework 200 to the individual user devices 102. The display information is typically provided in a markup language providing links between individual pages. In one example, the display manager 204 is based on website meta language ("WML") enhanced with certain extensions. It will be appreciated, however, that other markup languages can be supported. In the example, the display manager 204 may serve pages of display information to individual user devices 102 under the control of the software application framework 200. The display manager 204 may also serve individual pages in response to user input received from individual user devices 102. Pages served by the display manager 204 can be cached locally on the base station 100 or user device 102, or fetched from the Internet application services 14.

In many embodiments, a call information manager 210 routes incoming calls to specific user devices 102 based on a downloaded "call-rule" table. In one example, a call information manager 210 receives an incoming call alert from the device control software 20 through the DAPI 202 which provides certain network information associated with the call. The certain information may include called number, calling number, calling name and additional information as required by the application. Upon receiving the call alert, the call information manager 210 typically accesses the call-rule table to determine if there are any special call handling rules that need to be applied to an identified call. The call information manager 210 typically combines call-handling rules with a current time and user presence information to route the call. In one example, the call-rule table comprises call identification elements such as called number, calling number, calling name and dialed number, call target information such as user device, presence status, message, block, greeting and line, time elements such as time of day and day of week, presentation elements such graphics, text and ring tone information. Typically, the call information manager 210 compares the call identification with entries in the call-rule table to determine any required action associated with the call. If a match is found, the call information manager 210 may test the time elements to determine what action needs to be taken. If the time elements indicate that action needs to be taken then the call information manager 210 can access the call target information and presentation elements to decide how to route the call and which additional information should be provided with the call.

Figure 3:
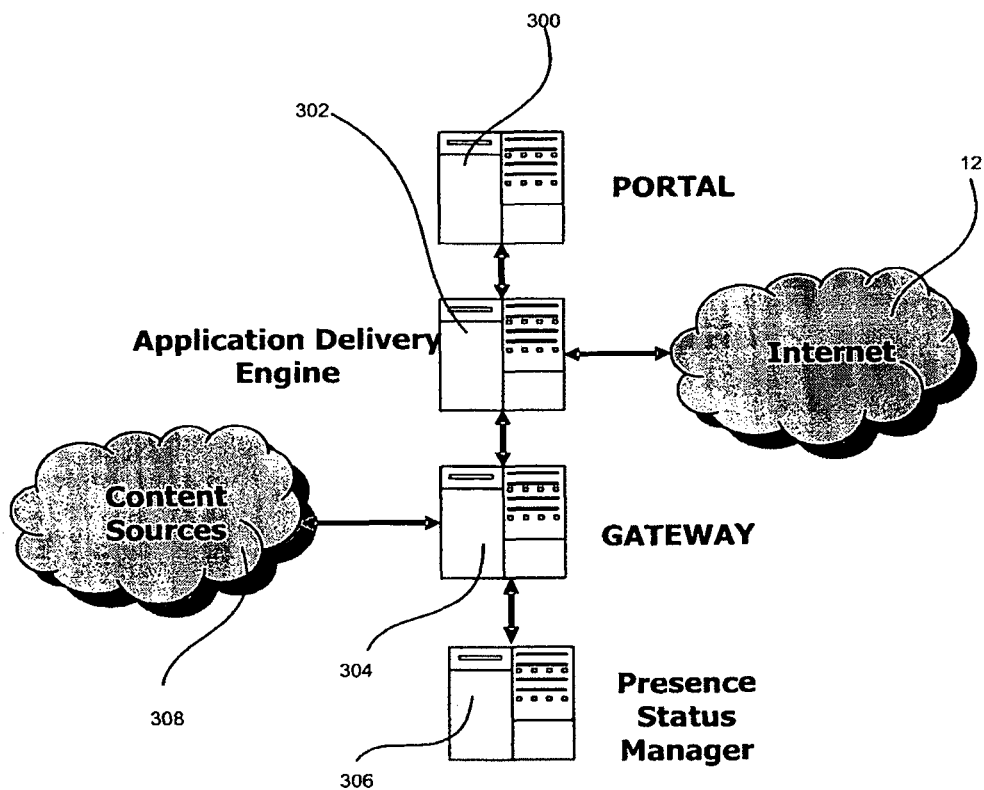
FIG. 3 illustrates the provision of Internet application services and data in accordance with an example embodiment.

Referring now to FIG. 3, which should be viewed with FIGS. 1 and 2, in many embodiments, the Internet application services 14 comprise a user portal 300, application delivery engine 302, content and service gateway ("gateway") 304 and presence status manager 306. Although illustrated as a set of discrete components, embodiments of the invention distribute user portal 300, application delivery engine 302, gateway 304 and presence status manager 306 over multiple devices or may consolidate elements of user portal 300, application delivery engine 302, gateway 304 and presence status manager 306 into one or more discrete devices.

In many embodiments, the user portal 300 provides a web based user interface to allow users to configure parameters of the system. The user portal 300 may allow a master user to configure the rules of the system. The rules of the system typically control the performance of the application delivery engine 302 as it applies to specific users, the relationship between a specific base station 100 and its registered user devices 102 together with a user's content privileges, which control the gateway 304. The user portal 300 may also provide configuration pages for additional users within the system configuration for a single user device 102. The additional users can configure the types of configuration information they want to access as well as how calls can be routed and which personalization information should be associated with each call. The configuration options vary based on the requirements of the system provider.

In certain embodiments, the application delivery engine 302 manages the scheduling and flow of information from one or more gateways 304 to a plurality of base stations 100 over the Internet 12. One example of an application delivery engine 302 combines a VoIP soft switch with a scheduling engine. In the example, the engine accesses gateways 304 to gather appropriate information. Access to the gateways 304 is typically triggered by a scheduled event or responsive to requests from a base station 100 as defined by the access-rules table. The access-rules table may include information location entries such as which gateway 304 should be accessed, presence entries including presence status manager 306 status for a user, provider enabled option entries such as what capabilities the provider will allow the user to access, user configured options such as what capabilities the user has configured, time elements that, for example, control scheduled events, user mapping including relationship between users, base stations 100 and user devices 102. In many embodiments, the application delivery engine 302 compares a request against the access-rules table to determine how to process a request or whether a scheduled data needs to be sent.

In many embodiments, the gateway 304 provides access to external data and services 308. The gateway 304 typically receives configuration data from the user portal 300 which controls the data to be accessed and location of the data to be accessed.

The gateway can access the data under control of the application delivery engine 302. Once data is accessed, the gateway 304 may transcode the data into application delivery engine 302 format and provide it to the application delivery engine 302. The gateway 304 may also receive data from the application delivery engine 302. Where the gateway 304 receives data from the application delivery engine 302, it may transcode data into correct external format and transmits the transcoded data to the appropriate external data or application service 308.

In certain embodiments, the presence status manager 306 manages the presence status of individual users through their interaction with a specific user device 102. The presence status manager 306 receives user presence messages via the application delivery engine 302 in response to login or logout actions. The presence status manager 306 keeps active presence state for all users and communicates this information to the appropriate gateway 304 to enable external services 308 such as Instant Messaging and Peer-To-Peer calling. The presence status manager 306 provides the presence state information to the application delivery engine 302 as part of the access-rules table.

In many embodiments, the Application and Services Communication Protocol (ASCP) can be based on an extension of existing VoIP protocols such as SIP (RFC 3261). Basing ASCP on published standards offers many benefits including the ability to traverse NAT/Firewalls, which are typically present when a broadband communication system is connected to the Internet 12. In many embodiments extension of a particular VoIP protocol may require the creation of new request or message types, sometimes also referred to as a "method". These new request types typically contain a payload that encapsulates the application data sent between the application delivery engine 302 and base station 100. The size of such payloads can be of an arbitrary size and there is typically no restriction on the connection protocol used (i.e. TCP, UDP, etc.).

In some embodiments where an extended SIP is employed, requirements for extension may be at least partially satisfied in existing extensions implemented for Instant Messaging. The extension is called Session Initiation Protocol for Instant Messaging and Presence Leveraging Extensions ("SIMPLE") and standardized as RFC 3428. Certain embodiments of the present invention may rely on SIMPLE, typically with further extension. In one example, the "message" method is used as the request type to pass the application data. In the latter example, the Content-Type can be something indicative of the application payload, such as: application/WML.

Feature Operation Examples

Embodiments of the invention permit service providers to offer a range of enhanced applications and services in conjunction with their standard broadband communication offers. The following examples are provided as illustrative of applications in accordance with certain aspects of the invention.

Messaging Access

A messaging access feature can permit a user to access both voice mail and email messages from a user device 102 within a home. In implementing the messaging access, a gateway 304 may integrate with an existing message store and can transcode the information from the store into user device 102 displayable information. In one example, an application delivery engine 302 receives information from the gateway 304 and packages the information into an ASCP message for transmittal to a selected base station 100, where it may be cached. The base station 100 typically sends an alert to the user device 102 along with the first page of cached information. The user can access additional information via a user interface on the user device 102. If the information requested has not been cached in the base station 100, the base station 100 will typically communicate with the application delivery engine 302 to access the additional information. The application delivery engine 302 may then communicate with the gateway 304 to pull the additional information. Delivery of the new information may follow the methods similar to those discussed above.

In many embodiments, the user can send messaging information using the method descried above. Typically, the information can be sent in either text or voice format. To send text, the user typically interacts with a content screen on the user device 102 provided by the software application framework 200. The content screen may gather textual content and send it to the software application framework 200. The software application framework 200 can typically generate an ASCP message with appropriate content and send it to the application delivery engine 302 which forwards it to the gateway 304. The gateway 304 may reformat the information into a correct form and send it to the appropriate message store. To send voice, the user typically interacts with the content screen on the user device 102, the content screen being provided by the software application framework 200. The content screen may communicate with the software application framework 200 to open a voice channel to a voice recording device. Typically the voice recording device stores voice message information and then communicates to the software application framework 200 and application delivery engine 302 that the message is stored. The application delivery engine 302 typically sends one or more voice packets to the gateway 304 which may reformat the voice packets and send the packets to an appropriate message store.

Phone Book Access

In certain embodiments, a phone book access feature allows a user to access a network based address book through the user device. The user can interact with the user device user interface to select a phone book option. Upon selecting the phone book option, the user device may send a request to a base station 100 to send a subset of a current phone book data to the user device 102. The base station 100 typically requests the data from gateway 304 through application delivery engine 302. The gateway 304 may request the data and packages in an ASCP message and send it to the base station 100 through the application delivery engine 302. The base station 100 typically provides the user interface for managing the searching of the data and request for additional blocks as required by user requests.

In many embodiments, the user can update the network based phone book data through the user device 012. For example, the user may access an "add phone data" page on the user device 102. The user device 102 may then communicate with the base station 100 to request the required data entry page data. Upon receiving the latter request, the user device 102 may communicate data entry input to the base station 100. The base station 100 typically packages the data within an ASCP message and sends it to the gateway 304 via the application delivery engine 302. The gateway 304 can translate the data into a preferred format and can store it in the network phone address book.

Instant Message Access

In certain embodiments, instant messaging access permits a user to access instant messaging buddy lists, send and receive text based IM messages and send/receive one way and two way voice calls to and from buddy list entries. The user may interact with the user device 102 user interface to select the instant message option. Upon selecting the instant message option, the user device 102 may send a request to the base station 100 to send the current user buddy list status to the user device 102. The base station 100 can then request the requested data from the gateway 304 through the application delivery engine 302. The gateway 304 may request the data and packages in an ASCP message and can sends the message to the base station 100 through the application delivery engine 302 . The base station 100 typically provides the buddy list status to the user device 102. The user may then be able to view and scroll through the current buddy list status. This status can provide links to instant messages and other status information. The user can typically access the other status information through the user device 102/base station 100/application delivery engine 302/gateway 304 communication channel.

To guarantee that the buddy list data is up to date, the gateway 304 will typically send buddy list information asynchronously to the application delivery engine 302. The application delivery engine 302 may access the presence status manager 306 to determine if the information needs to be forwarded to a selected base station 100.

In one example, the user can place a call to a buddy list entry by highlighting the buddy list entry on the user device 102 and selecting the call option. The user device 102 may then communicate this selection to the base station 100. The base station 100 can request the call setup information from the gateway 304 via the application delivery engine 302. The gateway 304 typically communicates with the network based Instant Message system to determine all of the required information to setup the requested call. The gateway 304 can package the information within an ASCP message and send it to the base station 100 via the application delivery engine 302. The base station 100 may establish the VoIP call between the user device 102 and the requested IM client.

Half Duplex Voice Communication Between Systems

Embodiments of the invention provide a mechanism that allows a first user device 102 connected to a first base station 100 to communicate with a second user device 102 connected to a second base station 100, wherein the connection is created as a half duplex voice communication. The mechanism further includes a communication between the first and second user devices 102 is established responsive to activation of one of a talk button and a soft key on the user device 102. The mechanism further includes a simultaneous communication between the first user device 102 and a third user device 102 connected to a third base station 100, wherein the form of communication is configured on a user portal 300 such that the configuration applies to first and second user devices 102 and first and second base stations 100. The mechanism further includes a simultaneous communication between the first user device 102 and a plurality of other user devices 102.

Record and Delivery of Voice Messages to Distributed Base Stations

Embodiments of the invention provide a method for recording a voice message on a first base station 100 and delivering the voice message to a second base station 100, wherein the delivery is controlled by a user portal 300 provided through the first base station 100. The method further includes delivery of a voice message to a plurality of destinations by the first base station 100, wherein delivery to the plurality of destinations is controlled by selection of options configured by a user of the user portal 300. The method further includes control of the delivery by other options provided at a user device 102, wherein upon establishing the options, the base station 100 transmits the message to the user portal 300 and the user portal 300 retransmits the message to target recipients.

Reply to the Delivery of Voice Messages From Distributed Base Stations

Embodiments of the invention provide a method for replying to a sender of a distributed voice message wherein certain options may be configured by a user via a user portal 300 and further configured by options provided on a user device 102. The method further includes replying to all the recipients of the distributed voice message. The method further includes addressing and delivery of a reply message wherein the addressing and delivery is managed by the user portal 300 in the same manner as the original delivery of the distributed voice message.

Archiving Base Station Voice Messages to Internet Data Store

Embodiments of the invention provide methods for archiving recorded voice messages from a base station 100 to a persistent storage location through a user portal 300, wherein a user selects an archive option from a list of message commands. The methods further include sending a digitally recorded message as a package to the user portal 300 where it is archived for future access.

Base Station Voice Message Indication to Mobile Phones Via SMS

Embodiments of the invention provide an indication when a base station 100 answering machine has received a message. In some embodiments, the indication is provided as an SMS message and the SMS message is received by at least one SMS capable device. Some embodiments further comprise indication rules that define characteristics of the received message including type of message, callerID from which message was received, phone number of an SMS device, wherein the indication rules are configured in a user portal 300. In some embodiments, the base station 100 automatically sends SMS indications responsive to receipt of a voice message.

Message Waiting Indication (MWI) for Messages Stored on External Email Servers

Embodiments of the invention provide at least one MWI indication on one or more user devices 102, MWI indications including a text message and blinking LED, wherein the at least one MWI indicator indicates that a new email has been received in an external email service, the external mail service including AOL and Hotmail. Embodiments of the invention further provide that a user portal 300 communicates with the external email service 308 via one or more established APIs and receives an indication that an identified email account has received a message. Embodiments of the invention further provide that the user portal 300 determines whether the external email account 308 is associated with a user account and whether the user account is configured for email notification. Embodiments of the invention provide that the user portal 300 sends the notification message to a base station 100 associated with the associated user account. Embodiments of the invention further provides that the notification message includes identification of one or more target user devices 102, wherein the target user devices 102 are identified in the user portal 300, the target user devices 102 being associated with the user account. Embodiments of the invention further provide that the base station 100 sends an appropriate message to the target user devices 102 to enable the configured MWI indications.

Automatic System Registration Creating Personal User Portal Website

Embodiments of the invention provide a method for automatic registration of a base station 100 to a user portal 300. In some embodiments, the method further includes generating a registration responsive to initial connection of a non-configured base station 100 to the Internet 12 via a persistent data connection. In some embodiments, automatic registration pre-configures a user specific user portal page, the user specific portal page having associated system information preloaded.

Shared Contact Lists

Embodiments of the invention provide a method for users to share contact lists on a user portal 300, wherein the sharing includes allowing a plurality of users to select certain contacts for sharing. In some embodiments, the shared contacts are combined with a communal group of contacts that any user can access. In some embodiments, the method includes displaying the shared contacts and accessing the shared contacts in the same manner as a personal group of contacts. In some embodiments, the method includes allowing users to register with groups associated with the shared contacts.

Voice Packetization for Server Based Speech Recognition

Embodiments of the invention provide a method to packetize and store a spoken voice phrase on a client device 102 to obtain a voice packet, send the voice packet to a speech recognition engine located in a user portal 300, resolve the voice packet into a specific command, execute the specific command and send a response to the client device 102, the response being based on results obtained from execution and options to be provided to the client device 102.

Speech Recognition to Establish Calls

Embodiments of the invention provide a method for using a voice packetization system to establish voice calls based on use spoken commands.

Speech Recognition to Lookup Data

Embodiments of the invention provide a method for using a voice packetization system to use spoken commands for retrieving information and displaying the information on a user device 102.

Visual Access to Distributed Voice Mail Systems

Embodiments of the invention provide a method for a single web site to access and display the voice messages stored on distributed, internet connected answering machines.

Retrieval and Playback of Stored Answering Machine Messages

Embodiments of the invention provide a method for using a single web site to display distributed answering machine messages, and further for playing back the answering machine messages to one or more users.

Proxy for Remote Extensions Off of IP-PBX

Embodiments of the invention provide a proxy for remote IP phones associated with an enterprise IP-PBX, wherein a base station 100 spoofs the IP-PBX IP phone protocol such that a user device 102 appears as an extension of the enterprise IP-PBX.

Variable Function Docking Stations

Embodiments of the invention provide one or more docks that have capabilities including buttons, displays and wireless integration options, wherein full functionality is obtained by combining a user device 102 with a dock.

Changing the Personality of a User Device by Installing in Different Docks

Embodiments of the invention provide a plurality of docks wherein behavior of a user device 102 is changed by the characteristics of any of the plurality of docks to which the user device 102 is connected. Further, each of the plurality of docks provides a personality key that is readable by a connected user device 102, wherein the connected user device 102 varies its operation responsive to specific functions and capabilities provided by the dock.

Enable Speaker Phone on User Devices to Monitor Audio Over the Internet

Embodiments of the invention permit a user to enable a specific microphone and monitor audio within range, the microphone communicating with the user by an Internet 12 connection.

SIP Application Protocol

Embodiments of the invention provide a method to communicate application information between a base station 100 and user portal 300, wherein communication is facilitated by SIP connections. The method further includes transmitting uplink communication using SIP-AP and downlink communications encapsulated within SIP messages.

SIP-AP Enabled Display Control

Embodiments of the invention provide a method wherein SIP-AP is used for controlling display function of a user device 100 by a user portal 300, wherein the user portal 300 sends a combination of single and multiple linked display pages to the user device 102. In some embodiments, the method includes caching the display pages prior and displaying the display pages on the user device 102.

User Portal Initiated SIP-AP Enabled Display Control

Embodiments of the invention provides a system in which a user portal 300 asynchronously controls a display in a user device 102. In some embodiments, the system provides a trigger based on scheduled events and externally integrated application state changes.

Single Base Station--Multiple Handset Support

Embodiments of the invention provide a system in which a single base station 100 manages SIP-AP communications with multiple registered handsets 104. In some embodiments, the base station 100 is adapted to cache in a storage specific information sent by a user portal 300 associated with each of the multiple registered handsets 104 and to communicate with the user portal 300 for retrieving other information associated with one or more user devices 102, wherein the other information is not found within the storage and wherein the other information is routed to the associated one or more user devices 102.

IM Proxy

Embodiments of the invention provide an IM proxy for maintaining multiple virtual IM clients on an IM network, wherein at least some of the virtual IM clients are associated with a handset 104 and the virtual IM clients provide IM functionality to the associated handsets 104, and wherein the associated handsets 104 are incapable of independently communicating on an IM network. In some embodiments IM communications with the associated handsets are directed to the IM Proxy through the SIP Application Protocol.

It is apparent that the above embodiments may be altered in many ways without departing from the scope of the invention. For example, further, the invention may be expressed in various aspects of a particular embodiment without regard to other aspects of the same embodiment. Still further, various aspects of different embodiments can be combined together. Accordingly, the scope of the invention should be determined by the following claims and their legal equivalents.

The invention claimed is:

1. A system for delivering enhanced application services to a user device, comprising:

at least one user device;

a portal that defines user privileges for a base station coupled to said at least one user device and schedules delivery of application services to said base station, wherein the portal provides a user interface to allow users to configure parameters for the system and to configure rules for the system, wherein the rules control performance of an application delivery engine;

a gateway component residing on a computational device that receives requests for application services originating from said at least one user device, and, responsive to a request for service, transcodes a received response to said request for display on the user device, wherein the gateway component provides access to the application services by receiving configuration data from the portal which controls the data to be accessed and location of the data to be accessed;

wherein the rules that control performance of the application delivery engine, applies to specific users, a relationship between a specific base station and its registered user device together with a user's content privileges, which control the gateway, wherein said application delivery engine, residing on a computational device, manages and schedules delivery of application services from said gateway to said base station, and wherein said application delivery engine, triggered by any of: a scheduled event and a request from said specific base station accesses said gateway to gather appropriate information and wherein said gateway accesses said information under control of said application delivery engine;

said base station comprising a processor comprising program code for performing the operations of:

receiving responses from said gateway, identifying incoming messages and at least one of: translating incoming messages to user device presentable information, managing presentation of information to the user device, managing download and storage of applications, identifying information associated with an incoming message, and routing the incoming message and the associated information to the user device, for providing an address book manager for managing an address book user interface and maintaining one or more shared address books accessible by other users of the system, and storing at least the response and at least one incoming message.

2. The system of claim 1, wherein said base station further comprises:

program code for integration of said address book with a network based phone directory, the phone directory including contacts from an instant messaging buddy list, determining an instant messaging status for users included on the buddy list;

wherein the address book manager provides access to selected portions of said address book, wherein portions are selected by commands received from said at least one user;

said base station further comprising:
- storage for storing said instant messaging buddy list and corresponding phone number for each buddy in the instant messaging buddy list.

3. A system according to claim 1, further comprising an access-rules table comprising at least one of: location entries into the system, presence entries, user-configured options, time elements, and user mapping.

4. The system of claim 1, wherein application services are transmitted to the user device using an application and services communication protocol (ASCP) and packaged as an ASCP message.

5. The system of claim 1, further comprising a call-rule table comprising rules for associating a user device with an incoming call and wherein a call information manager routes a call based on factor including time information identifying the source of the call.

6. The system of claim 1, wherein the base station communicates with the gateway using Session Initiation Protocol (SIP).

7. A system for delivering enhanced network services, comprising:
- a computer programmed as a gateway that accesses one or more network services responsive to a request from a user device, the gateway being configured to receive a response from the one or more network services and to format the response for presentation by the user device;
- wherein the gateway provides access to the application services by using configuration data from a portal, wherein the portal defines user privileges for a base station coupled to said user device and schedules delivery of application services to said base station, wherein the portal provides a user interface to allow users to configure parameters for the system and to configure rules for the system, wherein the rules control performance of an application delivery engine, said configuration data controlling the data to be accessed and location of the data to be accessed;
- wherein the rules that control performance of a computer programmed as an application delivery engine, applies to specific users, a relationship between a specific base station and a user device registered with said specific base station together with a user's content privileges, that, triggered by any of: a scheduled event and a request from said specific base station, accesses said gateway to gather appropriate information and wherein said gateway accesses said information under control of said application delivery engine and manages and schedules delivery of the information or network services to the user device; and
- a computer and a software application framework resident on said computer, which, when executed on said computer, establishes a display manager and a download manager, wherein the software application framework, when executed, enables the user device to communicate with the gateway through a base station, and wherein the base station is adapted to translate primitive requests from the user device for transmission to the gateway and further adapted to receive formatted responses from the gateway for transmission to the user device.

8. A method for providing enhanced telecommunications services comprising the steps of:
- a computer receiving a request from a user device, the request being encoded in a first format;
- a computer translating the request to obtain a command encoded in a second format;
- responsive to the command, a computer soliciting one or more service providers for a desired service;
- a computer receiving from the one or more service providers information responsive to the solicitation;
- a computer translating the information to obtain a response encoded in the first format; and
- a computer transmitting the response to the user device, wherein the response contains the desired service and wherein the first format includes voice and data information,
- wherein at least one of the computers is programmed as a gateway that accesses one or more network services responsive to a request from the user device, the gateway being configured to receive a response from the one or more network services and to format the response for presentation by the user device; wherein the gateway provides access to the application services by using configuration data from a portal, wherein the portal defines user privileges for a base station coupled to said user device and schedules delivery of application services to said base station, wherein the portal provides a user interface to allow users to configure parameters for the system and to configure rules for the system, wherein the rules control performance of an application delivery engine, said configuration data controlling the data to be accessed and location of the data to be accessed,
- wherein the rules that control performance of an application delivery engine applies to specific users a relationship between a specific base station and a user device registered with said specific base station together with a user's content privileges, that, triggered by any of: a scheduled event and a request from said specific base station, accesses said gateway to gather appropriate information and wherein said gateway accesses said information under control of said application delivery engine and manages and schedules delivery of the information or network services to the user device.

9. The method of claim 8, wherein the user device is a telephone handset.

10. The method of claim 8, wherein a computer transmitting the response includes the step of a computer providing selected portions of the response to the user device responsive to commands received from the user device.

11. The method of claim 8, further comprising the step of a computer establishing a voice connection between the user device and one or more other user devices.

12. The method of claim 8, wherein the second format includes SIP encoding.

13. The method of claim 8, wherein presentation of response on the user device is controlled by a base station having a processor and storage and adapted to provide a user interface on the user device.

14. The method of claim 13, wherein the user device is a telephone handset and the user interface includes audio and visual components.

15. The method of claim 13, wherein, responsive to commands received from the user device, the base station is adapted to navigate the response and provide selected portions of the response to the user device.

16. A computer-implemented method for sending voice calls to a person associated with a user's buddy list comprising the steps of:
- a base station receiving a request from a user device to transmit the user's buddy list to the user device;
- a portal that defines user privileges for a base station coupled to said at least one user device and schedules delivery of application services to said base station, wherein the portal provides a user interface to allow users to configure parameters for the system and to configure rules for the system, wherein the rules control performance of an application delivery engine;

the base station transmitting the request to a gateway component by way of an application delivery engine, controlled at least in part by rules configured at the portal, wherein the rules applies to specific users, a relationship between a specific base station and its registered user device together with a user's content privileges, said application delivery engine, residing on a computational device, managing and scheduling delivery of application services from said gateway to said base station, wherein said application delivery engine, triggered by any of: a scheduled event and a request from said specific base station accesses said gateway to gather appropriate information and wherein said gateway accesses said information under control of said application delivery engine, wherein the gateway component provides access by receiving configuration data from the portal which controls the data to be accessed and location of the data to be accessed;

the gateway component retrieving the buddy list and transmitting the buddy list to the base station by way of said application delivery engine;

the base station transmitting the buddy list to the user device;

the base station receiving a request to call a buddy on the buddy list;

the base station transmitting the request to call a buddy to the gateway component by way of said application delivery engine;

the gateway component retrieving the information for placing the call;

the gateway component transmitting the information to the base station by way of said application delivery engine; and the base station calling the requested buddy using voice over Internet protocol.

17. A computer program product comprising a non-transitory computer-readable storage medium having computer-readable instructions for a method for providing enhanced telecommunications services encoded thereon, the method comprising the steps of:

receiving a request from a user device enabled for at least one of DECT (Digital Enhanced Cordless Telecommunications) and WDCT (Worldwide Digital Cordless Telecommunications), the request being encoded in a first format;

translating the request to obtain a command encoded in a second format;

responsive to the command, soliciting one or more service providers for a desired service;

receiving from the one or more service providers information responsive to the solicitation;

translating the information to obtain a response encoded in the first format; and transmitting the response to the user device, wherein the response contains the desired service and wherein the first format includes voice and data information, wherein at least one of the computers is programmed as a gateway that accesses one or more network services responsive to a request from the user device, the gateway being configured to receive a response from the one or more network services and to format the response for presentation by the user device; wherein the gateway provides access to the application services by using configuration data from a portal, wherein the portal defines user privileges for a base station coupled to said user device and schedules delivery of application services to said base station, wherein the portal provides a user interface to allow users to configure parameters for the system and to configure rules for the system, wherein the rules control performance of an application delivery engine, said configuration data controlling the data to be accessed and location of the data to be accessed, wherein the rules that control performance of an application delivery engine applies to specific users a relationship between a specific base station and a user device registered with said specific base station together with a user's content privileges, that, triggered by any of: a scheduled event and a request from said specific base station, accesses said gateway to gather appropriate information and wherein said gateway accesses said information under control of said application delivery engine and manages and schedules delivery of the information or network services to the user device.

18. A computer program product comprising a non-transitory computer-readable storage medium having computer-readable instructions for a method for sending voice calls to a person associated with a user's buddy list encoded thereon, the method comprising the steps of:

a base station receiving a request from a user device to transmit the user's buddy list to the user device;

a portal that defines user privileges for a base station coupled to said at least one user device and schedules delivery of application services to said base station, wherein the portal provides a user interface to allow users to configure parameters for the system and to configure rules for the system, wherein the rules control performance of an application delivery engine;

the base station transmitting the request to a gateway component by way of an application delivery engine, controlled at least in part by rules configured at the portal, wherein the rules applies to specific users, a relationship between a specific base station and its registered user device together with a user's content privileges, said application delivery engine, residing on a computational device, managing and scheduling delivery of application services from said gateway to said base station, wherein said application delivery engine, triggered by any of: a scheduled event and a request from said specific base station accesses said gateway to gather appropriate information and wherein said gateway accesses said information under control of said application delivery engine, wherein the gateway provides access by receiving configuration data from the portal which controls the data to be accessed and location of the data to be accessed;

the gateway component retrieving the buddy list and transmitting the buddy list to the base station by way of said application delivery engine;

the base station transmitting the buddy list to the user device;

the base station receiving a request to call a buddy on the buddy list;

the base station transmitting the request to call a buddy to the gateway component by way of said application delivery engine;

the gateway component retrieving the information for placing the call;

the gateway component transmitting the information to the base station by way of said application delivery engine; and the base station calling the requested buddy using voice over Internet protocol.

* * * * *